United States Patent
Cho

(10) Patent No.: US 12,199,937 B2
(45) Date of Patent: Jan. 14, 2025

(54) COMMUNICATION ASSIST DEVICE

(71) Applicant: Panasonic Intellectual Property Management Co., Ltd., Osaka (JP)

(72) Inventor: Daiki Cho, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/234,595

(22) Filed: Aug. 16, 2023

(65) Prior Publication Data

US 2024/0031322 A1 Jan. 25, 2024

Related U.S. Application Data

(63) Continuation of application No. PCT/JP2021/006013, filed on Feb. 17, 2021.

(51) Int. Cl.
| | |
|---|---|
| *H04L 51/222* | (2022.01) |
| *G06F 40/40* | (2020.01) |
| *H04L 51/02* | (2022.01) |
| *H04L 51/52* | (2022.01) |

(52) U.S. Cl.
CPC ............ *H04L 51/222* (2022.05); *H04L 51/02* (2013.01); *H04L 51/52* (2022.05); *G06F 40/40* (2020.01)

(58) Field of Classification Search
CPC ....... H04L 51/222; H04L 51/52; H04L 51/02; G06F 40/40
See application file for complete search history.

(56) References Cited

U.S. PATENT DOCUMENTS

| | | | |
|---|---|---|---|
| 10,178,642 B1* | 1/2019 | Posner | .................. H04W 60/04 |
| 2007/0143290 A1 | 6/2007 | Fujimoto et al. | |
| 2017/0279957 A1* | 9/2017 | Abramson et al. | ..... G06F 21/36 |
| 2018/0152411 A1 | 5/2018 | Lee et al. | |
| 2018/0197409 A1* | 7/2018 | Youm | .................... G08B 25/08 |

(Continued)

FOREIGN PATENT DOCUMENTS

| | | |
|---|---|---|
| JP | 2006-190005 | 7/2006 |
| JP | 2008-242553 | 10/2008 |

(Continued)

OTHER PUBLICATIONS

International Search Report (ISR) issued Apr. 20, 2021 in International (PCT) Application No. PCT/JP2021/006013.

*Primary Examiner* — Minh Chau Nguyen
(74) *Attorney, Agent, or Firm* — Wenderoth, Lind & Ponack, L.L.P.

(57) ABSTRACT

A communication assist device includes an information reception unit that receives a message transmitted from a passenger terminal owned by a passenger in a moving body, a moving body identification unit that identifies the moving body based on passenger information which is included in the message received by the information reception unit and by which the passenger is able to be identified, and an information transmission unit that transmits the passenger information and information related to the message in association with each other to a communication device provided to the moving body identified by the moving body identification unit. The information reception unit, the moving body identification unit, and the information transmission unit are provided outside the moving body.

4 Claims, 11 Drawing Sheets

(56) References Cited

U.S. PATENT DOCUMENTS

| | | | | |
|---|---|---|---|---|
| 2018/0219943 | A1* | 8/2018 | Gummig | H04L 67/104 |
| 2019/0014371 | A1* | 1/2019 | Couleaud | H04N 21/431 |
| 2019/0037078 | A1* | 1/2019 | Kim | H04W 8/24 |
| 2019/0318278 | A1 | 10/2019 | Koki | |
| 2019/0384991 | A1* | 12/2019 | Lee | G06V 20/59 |
| 2020/0177725 | A1* | 6/2020 | Mutyala | H04M 1/72457 |
| 2020/0205006 | A1* | 6/2020 | Denis | H04L 63/1425 |
| 2020/0401906 | A1* | 12/2020 | Watson | G07C 5/08 |

FOREIGN PATENT DOCUMENTS

| | | |
|---|---|---|
| JP | 2009-207763 | 9/2009 |
| JP | 2009-295061 | 12/2009 |
| JP | 2011-166527 | 8/2011 |
| JP | 2013-138278 | 7/2013 |
| JP | 2014-127178 | 7/2014 |
| JP | 2018-515842 | 6/2018 |
| JP | 2018-85029 | 5/2019 |
| JP | 6591706 | 10/2019 |
| KR | 10-2155668 | 9/2020 |
| WO | 2019/049256 | 3/2019 |

* cited by examiner

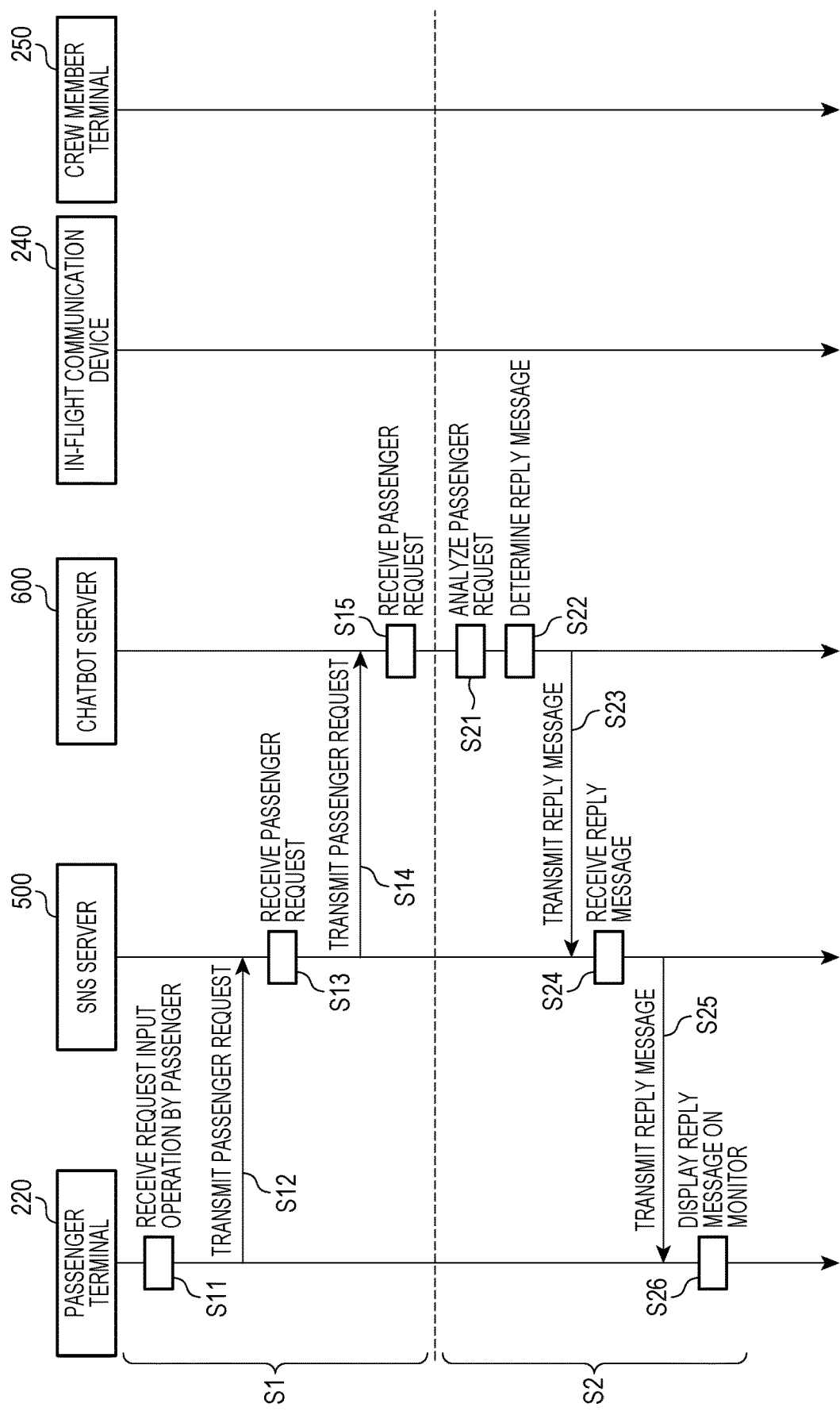

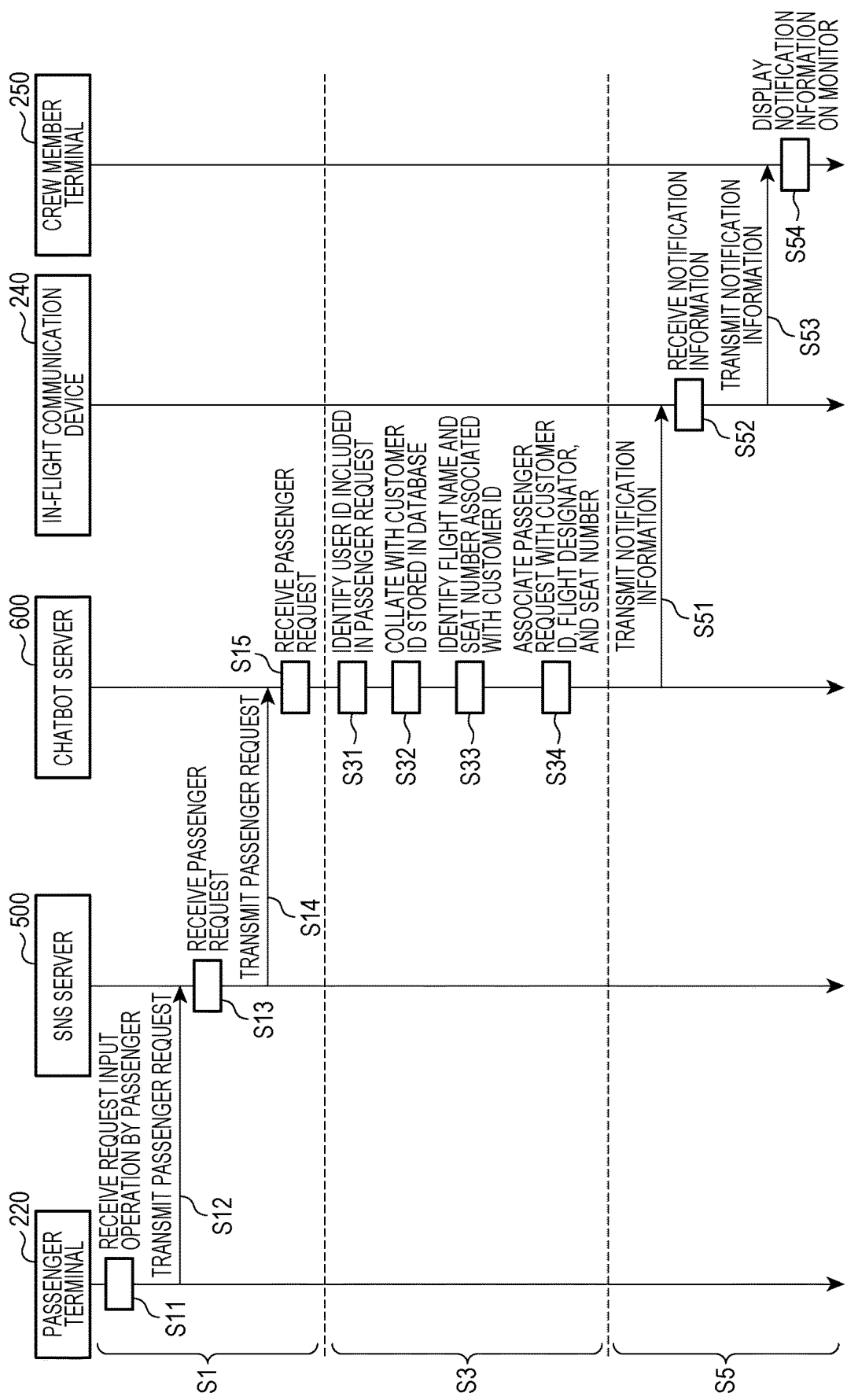

COMMUNICATION ASSIST DEVICE

TECHNICAL FIELD

The present disclosure relates to a communication assist device.

BACKGROUND ART

Patent Literature 1 discloses an information gathering system in which when a server receives a request for providing information on a predetermined information type by a client, information on the requested information type is registered so as to be provided, and the information provision of the predetermined information type is requested to a user mobile terminal carried by the user.

In recent years, since smart devices (for example, smartphones) are widely used, many users who use such smart devices can connect the smart devices to the Internet regardless of the location, for example, in an aircraft during navigation, and can use a communication aid service using the Internet.

CITATION LIST

Patent Literature

Patent Literature 1: JP2008-242553A

SUMMARY OF INVENTION

Technical Problem

The present disclosure is made in view of the above-described circumstances, and an object of the present disclosure is to provide a communication assist device capable of aiding smooth execution of communication between a passenger and a crew member.

Solution to Problem

The present disclosure provides a communication assist device. The communication assist device includes: an information reception unit that receives a message transmitted from a passenger terminal owned by a passenger in a moving body; a moving body identification unit that identifies the moving body based on passenger information which is included in the message received by the information reception unit and by which the passenger is able to be identified; and an information transmission unit that transmits the passenger information and information related to the message in association with each other to a communication device provided to the moving body identified by the moving body identification unit. The information reception unit, the moving body identification unit, and the information transmission unit are provided outside the moving body.

Advantageous Effects of Invention

According to the present disclosure, communication between passengers and crew members can be aided.

BRIEF DESCRIPTION OF THE DRAWINGS

FIG. 4 is a sequence diagram showing an example of the operation procedure (steps 1 and 2) of the communication aid system according to the first embodiment.

FIG. 5 is a sequence diagram showing an example of the operation procedure (steps 1, 3, and 5) of the communication aid system according to the first embodiment.

DESCRIPTION OF EMBODIMENTS

Background of Present Disclosure

Figure 1:
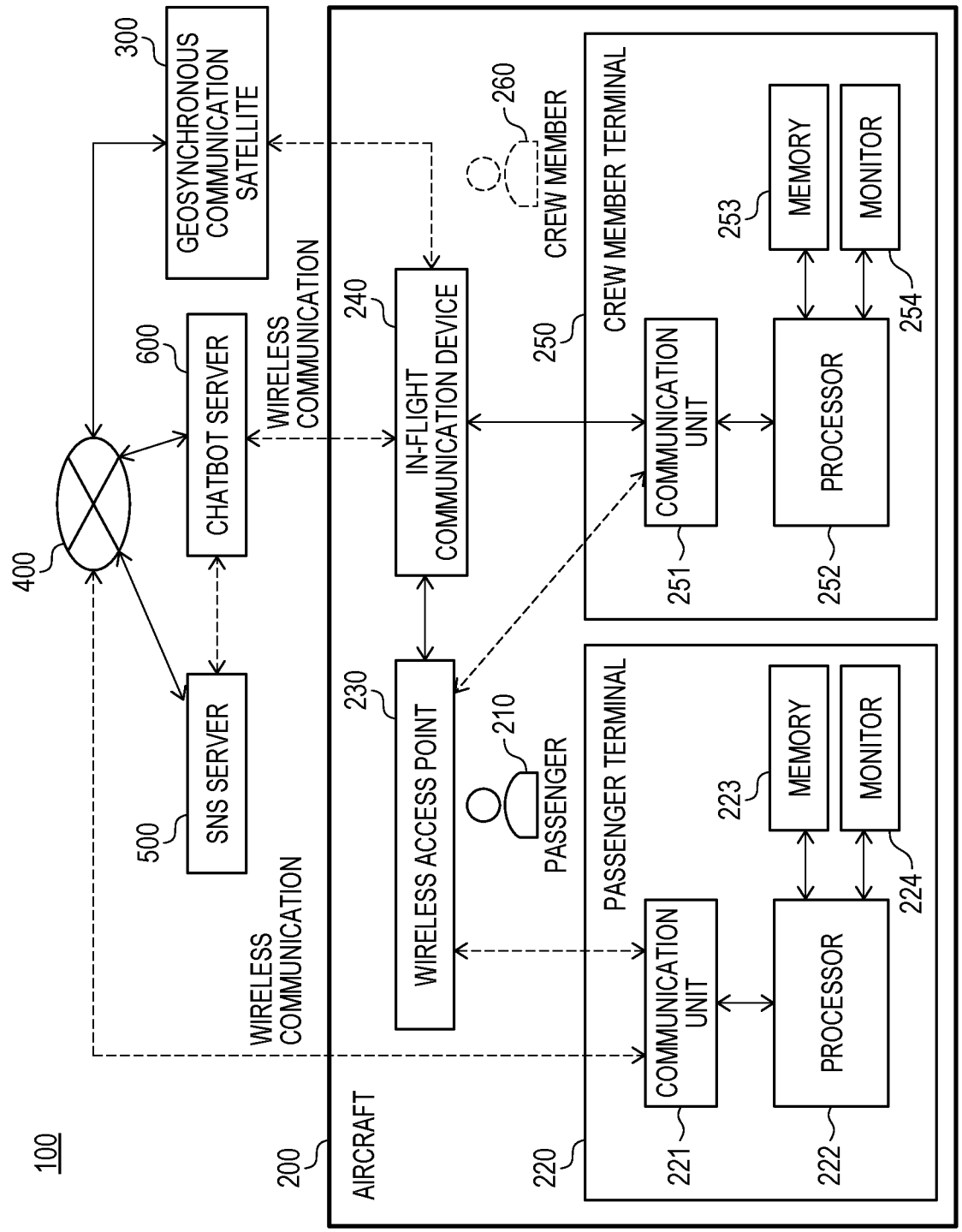
FIG. 1 is a block diagram showing an example of an overall configuration of a communication aid system according to a first embodiment.

Communication between a passenger and a crew member inside a moving body such as an aircraft is not indirect communication via a smart device but often direct communication such as Face to Face. Here, communication from a passenger using an aircraft (an example of the moving body) to a crew member has the following problems.

In recent years, in an aircraft, each seat is provided with a personal monitor capable of viewing movies, playing games, confirming flight status, or the like, or a terminal device capable of providing other in-flight entertainment. However, some aircrafts owned by low-cost airlines, such as a low-cost carrier (LCC), do not have the above-described personal monitor or terminal device provided at each seat. Therefore, in a case where communication is performed between a passenger and a crew member by using a personal monitor or a terminal device, there is a problem that not all aircrafts can provide such a communication method.

In addition, in order to reduce facility cost of the above-described personal monitor or terminal device, an in-flight entertainment system can be used by installing an in-flight entertainment application capable of providing a passenger service at the time of flight, to a terminal device owned by a passenger, such as a smartphone or a tablet terminal. However, in this case, the in-flight entertainment application is not necessarily installed in the terminal devices of all passengers using the aircraft. In addition, since the in-flight entertainment application is an application having a low frequency of use, there is a tendency that the application is not preferred for passengers, for example, to compress storage in the terminal device of the passenger.

Further, in the communication aid service disclosed in Patent Literature 1, the server selects a user (information provider) based on a content requested by a client (information requester) and requests the user mobile terminal carried by the selected user to provide information. However, direct communication such as Face to Face is performed in communication performed between the passenger and the crew member inside the moving body such as the aircraft. Therefore, the crew member needs to identify a location (for example, a flight number and a seat position) of the passenger.

Hereinafter, embodiments specifically disclosing configurations and operations of a communication assist device according to the present disclosure will be described in detail with reference to the drawings as appropriate. However, unnecessarily detailed descriptions may be omitted. For example, detailed descriptions of well-known matters and redundant descriptions of substantially the same configuration may be omitted. This is to avoid unnecessary redundancy of the following descriptions and to facilitate understanding of a person skilled in the art. The accompanying drawings and the following descriptions are provided for a person skilled in the art to fully understand the present disclosure and are not intended to limit the subject matters described in the claims.

Figure 2:
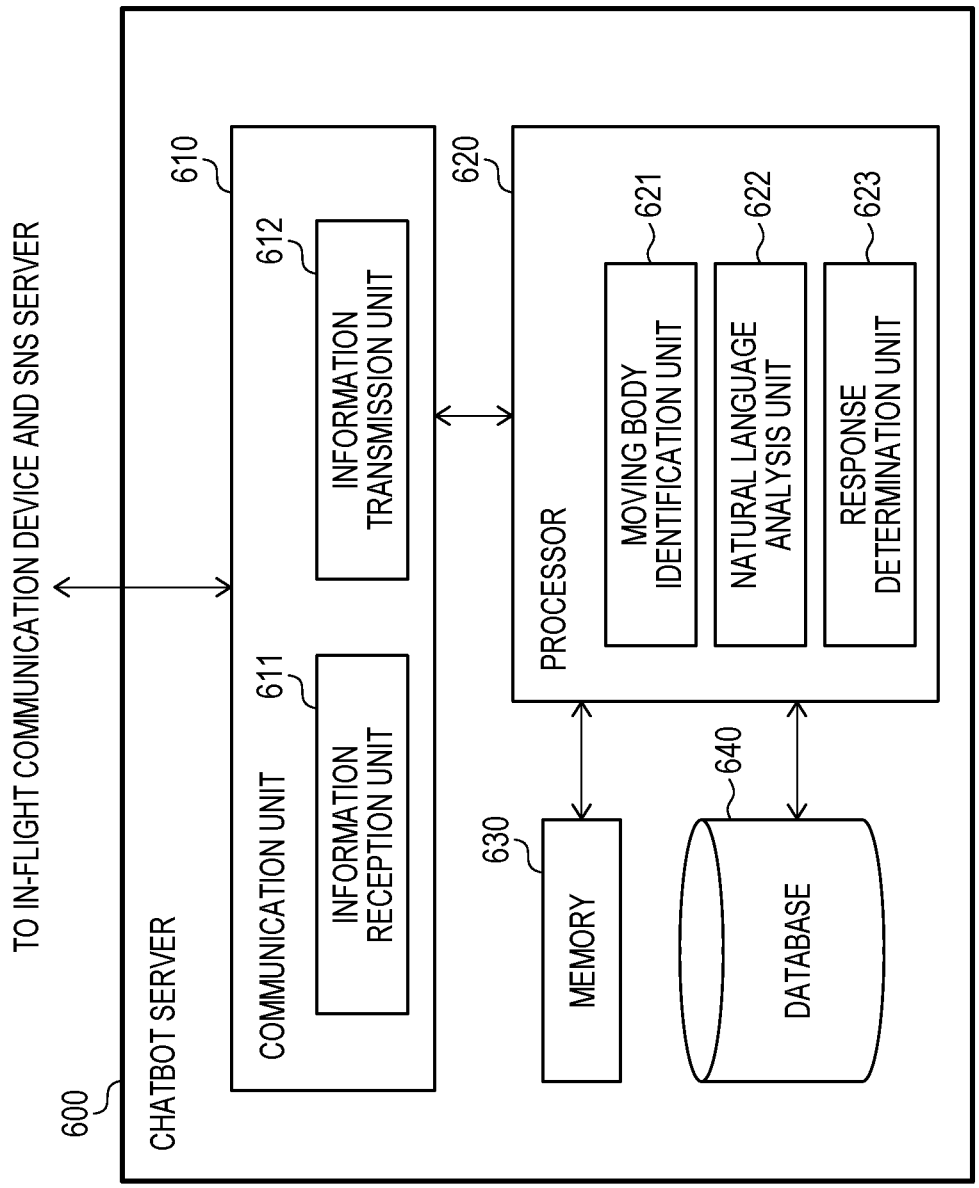
FIG. 2 is a diagram showing an example of an internal configuration of a chatbot server according to the first embodiment.

First, a communication aid system 100 will be described with reference to FIGS. 1 and 2. FIG. 1 is a block diagram showing an example of an overall configuration of the communication aid system 100 according to a first embodiment. FIG. 2 is a diagram showing an example of an internal configuration of a chatbot server 600 according to the first embodiment. The number of passenger terminals 220 and the number of crew member terminals 250 shown in FIG. 1 are one and may be two or more. Social networking service (SNS) servers 500 shown in FIG. 1 may be plural.

The communication aid system 100 according to the first embodiment is a system that aids communication between a passenger 210 and a crew member 260 in an aircraft 200 as an example of a moving body. The communication aid system 100 is a system that aids the communication performed between the passenger 210 and the crew member 260, for example, by transmitting a message (for example, a request or an inquiry to the crew member 260) of the passenger 210 input to the passenger terminal 220 owned by the passenger 210 to the crew member terminal 250 which can be operated by the crew member 260. The communication aid system 100 includes a moving body such as the aircraft 200, a geosynchronous communication satellite 300, an Internet line network 400, the SNS server 500, and the chatbot server 600. In the communication aid system 100 according to the first embodiment, for simplicity of explanation, an example of aiding the communication between the passenger 210 and the crew member 260 using one aircraft 200 as the moving body will be described, and the number of moving bodies may be plural.

The aircraft 200 as an example of the moving body includes one or more passenger terminals 220 owned by the passenger, one or more wireless access points 230, an in-flight communication device 240, and one or more crew member terminals 250. The aircraft 200 also has one or more passengers 210 and one or more crew members 260 on board. In the first embodiment, an example of the communication aid system 100 that aids the communication performed between the passenger 210 and the crew member 260 in the aircraft 200 as an example of the moving body is described, and the moving body is not limited to the aircraft 200 and may be, for example, a ship, a vehicle, a train, and a Shinkansen.

The passenger terminal 220 is, for example, a smartphone, a notebook personal computer (PC), or a tablet terminal, and is operated by the passenger 210. The passenger terminal 220 is connected to the wireless access point 230 and the internet line network 400 provided in the aircraft 200 to be able to execute data communication. In addition, the passenger terminal 220 is installed with an application capable of using a predetermined SNS in advance, and when a message indicating a request or the like of the passenger 210 to the crew member 260 is input by a passenger operation, the passenger terminal 220 transmits the input message (passenger request) to the SNS server 500 via the Internet line network 400. The passenger terminal 220 further displays on a monitor 224 of the passenger terminal 220 a reply message transmitted from the chatbot server 600 in response to the message (passenger request) transmitted to the SNS server 500. The passenger terminal 220 includes a communication unit 221, a processor 222, a memory 223, and the monitor 224.

The communication unit 221 is communicably connected to the SNS server 500 via the wireless access point 230, the in-flight communication device 240, the geosynchronous communication satellite 300, or the Internet line network 400. The communication unit 221 transmits to the SNS server 500 the message (passenger request) input by the passenger 210. The communication unit 221 also outputs a reply message MS2 (see FIG. 6A) transmitted from the SNS server 500 to the processor 222.

The processor 222 is implemented by using, for example, a central processing unit (CPU) or a field programmable gate array (FPGA), and executes various kinds of processing and controls in cooperation with the memory 223. Specifically, the processor 222 implements functions of each unit by referring to a program and data stored in the memory 223 and executing the program.

The memory 223 includes, for example, a random access memory (RAM) as a work memory used when processing of the processor 222 is executed, and a read only memory (ROM) that stores a program defining the processing of the processor 222. Data generated or acquired by the processor 222 is temporarily stored in the RAM. The program defining the processing of the processor 222 is written into the ROM.

The monitor 224 is a user interface including a display device such as a liquid crystal display (LCD) or an organic electroluminescence (EL) and an input device such as a button, a mouse, a keyboard, or a touch panel. The monitor 224 displays a message screen SC1 (see FIG. 6A) including a message transmitted and received between the chatbot server 600 and the passenger terminal 220 using a social networking service provided by the SNS server 500. The monitor 224 also receives an input operation of, for example, a message from the passenger 210.

The wireless access point 230 is provided in the aircraft 200 and connects the passenger terminal 220 and the in-flight communication device 240 to be able to execute wireless communication. It is needless to say that two or more wireless access points 230 may be provided in the same moving body.

The in-flight communication device 240 as an example of a communication device is provided in the aircraft 200 and is connected to the geosynchronous communication satellite 300 to be able to execute the wireless communication. The in-flight communication device 240 is communicably connected to one or more wireless access points 230 provided in the aircraft 200. The in-flight communication device 240 transmits the passenger request transmitted from the chatbot server 600 to the crew member terminal 250.

The crew member terminal 250 is a device including a monitor 254 capable of displaying the message (passenger request) of a smartphone, a notebook PC, a tablet terminal, or a smartwatch and a passenger position (for example, a seat number of the passenger 210). The crew member terminal 250 is connected to the internet line network 400 via each of the wireless access point 230 and the in-flight communication device 240 provided in the aircraft 200 and the geosynchronous communication satellite 300 outside the aircraft 200 to be able to execute the data communication. The crew member terminal 250 displays the passenger request transmitted from the chatbot server 600 via the wireless access point 230 or the in-flight communication device 240. The crew member terminal 250 includes the communication unit 221, a processor 252, a memory 253, and the monitor 254.

The communication unit 251 is communicably connected to each of the wireless access point 230 and the in-flight communication device 240 and outputs the passenger request transmitted from the chatbot server 600 to the processor 252.

The processor 252 is implemented by using, for example, a CPU or an FPGA, and executes various kinds of processing and controls in cooperation with the memory 253. Specifically, the processor 252 implements functions of each unit by referring to a program and data stored in the memory 253 and executing the program.

The memory 253 includes, for example, an RAM as a work memory used when processing of the processor 252 is executed, and an ROM that stores a program defining the processing of the processor 252. Data generated or acquired by the processor 252 is temporarily stored in the RAM. The program defining the processing of the processor 252 is written into the ROM. The memory 253 stores, for example, a seat table in which information related to the passenger (for example, a customer ID of the passenger managed by a management company that manages the aircraft 200), the seat number in the aircraft 200, and a name of the passenger are associated with one another.

The monitor 254 is a user interface including a display device such as a liquid crystal display (LCD) or an organic electroluminescence (EL) and an input device such as a button, a mouse, a keyboard, or a touch panel. The monitor 254 according to the first embodiment may be implemented by a display device alone. The monitor 254 displays a notification screen SC2 (see FIG. 6B) including an analysis result of the passenger request transmitted from the chatbot server 600, the information related to the passenger, and notification information including the seat number of the passenger. When an input device is included, the monitor 254 receives an input operation of the crew member 260.

The geosynchronous communication satellite 300 is a so-called geosynchronous satellite and is an artificial satellite that revolves in the same cycle as the rotation period of the Earth. The geosynchronous communication satellite 300 is connected to the Internet line network 400 and the in-flight communication device 240 to be able to execute the data communication. One geosynchronous communication satellite 300 is shown in FIG. 1, and it is needless to say that the number of the geosynchronous communication satellites 300 may be two or more.

The Internet line network 400 is connected to the passenger terminal 220, the geosynchronous communication satellite 300, the SNS server 500, and the chatbot server 600 to be able to execute the data communication.

The SNS server 500 is a server capable of providing the social networking service to the passenger terminal 220 in which an application dedicated to the SNS server 500 is installed and is implemented by a chat application such as LINE (registered trademark) or WhatsApp (registered trademark) in the description of the first embodiment, and it is needless to say that the SNS server 500 is not limited thereto. The SNS server 500 may transmit and receive the message (passenger request) and the reply message between the passenger terminal 220 and the chatbot server 600.

The SNS server 500 as an example of the server is communicably connected to the Internet line network 400 and is connected to the passenger terminal 220 and the chatbot server 600 via the Internet line network 400 so as to transmit and receive data therebetween. The SNS server 500 transmits to the chatbot server 600 the message such as the passenger request transmitted from the passenger terminal 220 and SNS user information (for example, a user identification (ID) used in an SNS service provided by the passenger 210 to the SNS server 500) of the passenger 210 owning the passenger terminal 220 in association with each other, or transmits to the passenger terminal 220 the reply message in response to the message such as the passenger request transmitted from the chatbot server 600.

The chatbot server 600 is connected to the in-flight communication device 240 and the SNS server 500 via an Internet line or the like to be able to execute the data communication. The chatbot server 600 stores, in a database 640, the SNS user information (for example, the user ID) used to identify the user in the SNS server 500 and the customer ID (for example, a member number of a mileage member) used to identify a customer by the management company that manages the aircraft 200. Specifically, the passenger 210 previously registers account information on the SNS acquired by a method such as OAuth2 authentication from the SNS server 500 in account information on the mileage member thereof in a web page or the like of the management company that manages the aircraft 200, thereby implementing this association. The association between the SNS user information and the customer ID is to be such that it can be understood that each of the SNS user information and the customer ID represents the same user, and a method for associating the SNS user information and the customer ID and a storage method are not particularly limited. The chatbot server 600 can identify from the customer ID an aircraft in which the customer is boarding (or is scheduled to board or has boarded). Specifically, the chatbot server 600 cooperates with a reservation system (not shown) of the management company that manages the aircraft 200, acquires boarding reservation information on the customer who can be identified by the customer ID, and identifies a flight designator, a seat number, and the like of a flight to board. The boarding reservation information on the customer copied to the database 640 in advance may be used. With the above-described functions, when receiving the message transmitted from the SNS server 500, the chatbot server 600 can identify the customer ID associated with the SNS user information based on the SNS user information associated with the received message, can identify the aircraft 200 used by the passenger 210 based on the identified customer ID, and can analyze contents (for example, the passenger request) included in the message, generate the reply message based on the analysis result, and transmit the reply message to the SNS server 500.

The chatbot server 600 transmits information on the identified aircraft 200, the information (for example, the seat number of the passenger 210) related to the passenger 210, and an analysis result obtained by analyzing the contents of the message to the crew member terminal 250 via the in-flight communication device 240 in association with one another. The chatbot server 600 includes a communication unit 610, a processor 620, a memory 630, and the database 640.

The communication unit 610 is connected to the in-flight communication device 240 and the SNS server 500 to be able to transmit and receive data. The communication unit 610 may transmit and receive data between the in-flight communication device 240 and the SNS server 500 via the Internet line network 400 or the geosynchronous communication satellite 300. Specifically, the communication unit 610 may be implemented by a LAN, a satellite communication device, or the like connected to the Internet line network 400 and may transmit and receive data to and from the SNS server 500. The communication unit 610 includes an information reception unit 611 and an information transmission unit 612.

The information reception unit 611 receives the message such as the passenger request transmitted from the SNS server 500 and outputs the message to the processor 620. The information transmission unit 612 transmits to the SNS server 500 the reply message in response to the message and transmits to the in-flight communication device 240 provided in the aircraft 200 the analysis result of the message such as the passenger request transmitted from the SNS server 500, the information (for example, the flight designator and a flight name) on the identified aircraft 200, and the information (for example, the seat number) related to the passenger 210 transmitting the message.

The processor 620 is implemented by using, for example, a CPU or an FPGA, and executes various kinds of processing and controls in cooperation with the memory 630. Specifically, the processor 620 implements functions of each unit by referring to a program and data stored in the memory 630 and executing the program. Each unit referred to here includes a moving body identification unit 621, a natural language analysis unit 622, and a response determination unit 623.

The moving body identification unit 621 refers to the database 640 based on the SNS user information output from the information reception unit 611 and identifies the customer ID registered in association with the SNS user information. The moving body identification unit 621 identifies the flight designator (flight number) of the aircraft 200 used by the passenger 210 and the seat number of the passenger 210 based on the identified customer ID of the passenger 210. The moving body identification unit 621 outputs to the response determination unit 623 the flight designator (flight number) of the aircraft 200 used by the identified passenger 210 and the seat number of the passenger 210 in association with each other.

The natural language analysis unit 622 executes natural language processing and analyzes the message (passenger request) of the passenger 210 transmitted from the SNS server 500. The natural language analysis unit 622 outputs an analyzed analysis result to the response determination unit 623.

The response determination unit 623 refers to the memory 630 and determines the reply message in response to the message of the passenger 210 and a notification message to be notified to the crew member 260 in the aircraft 200 based on the analysis result of the message output from the natural language analysis unit 622. The response determination unit 623 transmits the reply message determined in the SNS server 500, based on the analysis result output from the natural language analysis unit 622. In addition, the response determination unit 623 identifies the in-flight communication device 240 mounted on the aircraft 200 on which the passenger 210 is boarding from the flight designator (flight number) of the aircraft 200, which is output from the moving body identification unit 621, generates notification information in which the notification message and the seat number of the passenger 210 are associated with each other, and transmits the notification information to the in-flight communication device 240. The in-flight communication device 240 transmits the notification information transmitted from the chatbot server 600 to the crew member terminal 250. As an example of a method in which the response determination unit 623 identifies the in-flight communication device 240 as a message transmission destination, a method in which the response determination unit 623 per se includes a comparison table of the flight designator of the aircraft and the ID (for example, an IP address, a MAC address of a network, a serial number assigned to a radio device, or the like) for identifying an in-flight communication device mounted thereon, or a method in which an ID for identifying the in-flight communication device is stored in the database 640 instead of the flight designator and the ID is directly used is also considered. These methods are an example, and any method may be used as long as the method can uniquely identify the in-flight communication device 240 mounted on the aircraft 200 on which the passenger 210 is boarding. In addition, a method is also considered in which the response determination unit 623 does not specifically identify the in-flight communication device of the transmission destination, transmits the message using broadcast or multicast, and extracts only a message necessary for the response determination unit 623 by filtering with the flight designator at a system side mounted on each aircraft.

The memory 630 includes, for example, a RAM as a work memory used when processing of the processor 620 is executed, and a ROM that stores a program defining the processing of the processor 620. Data generated or acquired by the processor 620 is temporarily stored in the RAM. The program defining the processing of the processor 620 is written into the ROM. The memory 630 stores each of a plurality of reply messages corresponding to the message transmitted from passenger terminal 220, corresponding to the analysis result of the natural language analysis unit 622.

The database 640 is implemented using a hard disk drive (HDD) or a solid state drive (SSD). The database 640 registers (stores) the SNS user information (for example, the user ID), the customer ID of the passenger 210, which is managed by a management company of a moving body, and information related to the moving body (specifically, a flight number, a flight designator, a seat table, and the like of an aircraft) in association with one another. The information related to the moving body may be stored in another database (not shown). This is because it is sufficient that the information related to the moving body used by the customer can be acquired from the customer ID, and such a function is not necessarily implemented by a single database.

Each piece of information registered (stored) in the database 640 may include information (for example, a user ID and a customer ID) capable of identifying the passenger 210 and information capable of identifying the moving body used by the passenger 210 and the seat number based on the message (passenger request) transmitted from the SNS server 500. The chatbot server 600 may register (store) a media access control (MAC) address (an example of the information capable of identifying the passenger 210) of the passenger terminal 220 of each of a plurality of passengers and the flight designator (flight number) and the seat number of the aircraft 200 in association with one another. The database 640 shown in FIG. 1 shows an example of being integrally implemented with the chatbot server 600 and may be implemented as an external storage device that is separated from the chatbot server 600 and is connected to the chatbot server 600 to be able to execute the data communication.

Figure 3:
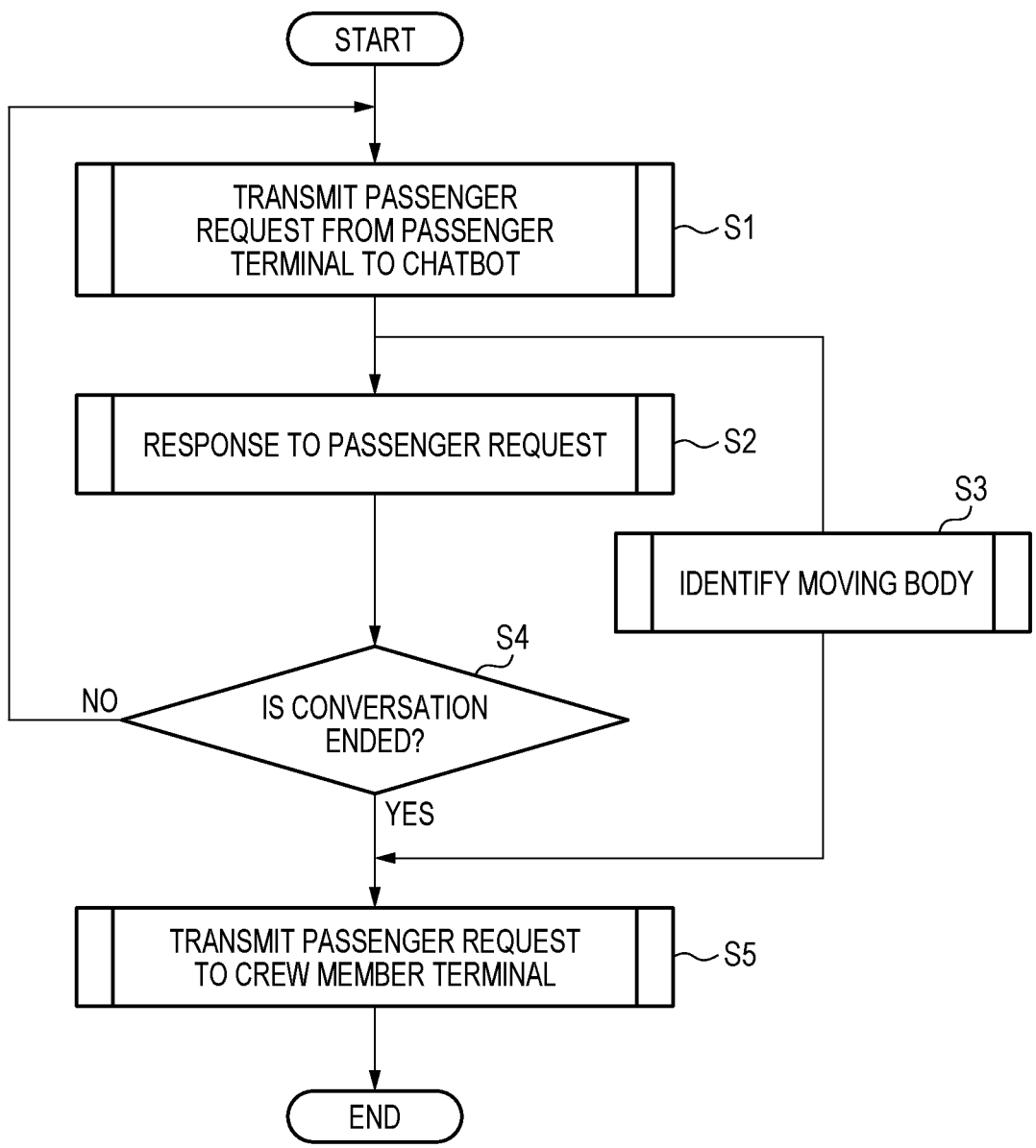
FIG. 3 is a flowchart showing an example of an operation procedure of the communication aid system according to the first embodiment.

Next, an example of an operation procedure of the communication aid system 100 according to the first embodiment will be described with reference to FIG. 3. FIG. 3 is a flowchart showing the example of the operation procedure of the communication aid system 100 according to the first embodiment.

The communication aid system 100 transmits the message (passenger request) input to the passenger terminal 220 from the passenger terminal 220 to the chatbot server 600 (S1). The communication aid system 100 executes a response to the message (passenger request) transmitted from the passenger terminal 220 (S2). The communication aid system 100 identifies the moving body based on the passenger information (for example, the user ID) included in the message transmitted from the passenger terminal 220 (S3).

The communication aid system 100 determines whether or not a conversation performed between the passenger 210 and the chatbot server 600 (that is, exchange of the message and the reply message, which uses the SNS server 500) is ended (S4). When determining that the conversation is ended (S4, YES), the communication aid system 100 generates, based on the information (for example, the flight designator or the flight number of the aircraft 200) on the identified moving body, the notification information in which the analysis result of the message transmitted from the passenger terminal 220 to the SNS server 500, the information (for example, the seat number) related to the passenger, and an identification result of the moving body are associated with one another, and transmits the notification information to the crew member terminal 250 in the moving body (S5). On the other hand, when determining that the conversation is not ended (S4, NO), the communication aid system 100 returns to processing of step S1.

Processing of identifying the moving body in step S3 may be executed at least once from a timing when the chatbot server 600 receives the message in the processing of step S1 (specifically, a timing of processing of step S15 shown in FIG. 4) to a timing when the chatbot server 600 transmits the message in processing of step S5 (specifically, a timing of processing of step S51 shown in FIG. 5). For example, when a plurality of messages (passenger requests) are transmitted from the passenger terminal 220, the chatbot server 600 may collectively transmit the notification information corresponding to each of the plurality of messages (passenger requests) to the crew member terminal 250 in the moving body or may transmit the notification information for each message.

Here, each processing of step S1 and step S2 shown in FIG. 3 will be described in detail with reference to F4. FIG. 4 is a sequence diagram showing an example of the operation procedure (steps S1 and S2) of the communication aid system 100 according to the first embodiment.

The passenger terminal 220 receives the input operation of the message including the passenger request and the like from the passenger 210 (S11). Furthermore, when receiving the transmission operation of the message by the operation of the passenger 210, the passenger terminal 220 transmits the message input to the SNS server 500 via the wireless access point 230 and the in-flight communication device 240, which are provided in the aircraft 200, the geosynchronous communication satellite 300, the Internet line network 400, and the like (S12).

It is needless to say that a transmission path of the message from the passenger terminal 220 to the SNS server 500 is not limited thereto. For example, in a case where the moving body is in a standby state at a predetermined place (for example, a port, an airport, or the like) and is communicably connected between the passenger terminal 220 and the Internet line network 400 in a wireless manner, the message may be transmitted from the passenger terminal 220 to the SNS server 500 via the Internet line network 400.

When receiving the message (passenger request) transmitted from the passenger terminal 220 (S13), the SNS server 500 transmits the message (passenger request) to the chatbot server 600 which is a transmission destination registered in advance (S14).

The content of the message in the first embodiment is described as an example in which the request content for requesting a predetermined service to the crew member 260 is mainly assumed, and it is needless to say that the content of the message is not limited thereto. The message may be input by the passenger 210 in a freer format. In a case where each of a plurality of options is presented by the chatbot server 600, the input of the message may be executed by selection of any option by the passenger 210 (for example, selection of an option such as "I want a drink" or "I want a blanket"), or may be executed by combining selection of any option and input of a message in a free format related to the selected option.

When receiving the message (passenger request) transmitted from the SNS server 500 (S15), the chatbot server 600 executes natural language analysis processing to analyze the message (passenger request) (S21). An analysis method executed by the natural language analysis unit 622 is, for example, a method of extracting from the message keywords that are considered to be deeply related to the request of the passenger 210, a method of interpreting a text of the message using techniques such as morphological analysis, and the like and is not limited thereto, and a known method that can estimate meaning of the message input by the passenger 210 may be used.

The chatbot server 600 determines the reply message to the message (passenger request) transmitted from the passenger terminal 220, based on the analysis result of the natural language analysis processing (S22). Here, the memory 630 in the chatbot server 600 includes a database in which each of a plurality of types of messages assumed to be transmitted from the passenger 210 and a reply message corresponding to each of the plurality of types of messages are associated with each other. The response determination unit 623 identifies the type of the message of the passenger 210 transmitted from the passenger terminal 220 based on the analysis result executed by the natural language analysis unit 622 and determines the reply message based on the type of the identified message with reference to the database of the memory 630.

The chatbot server 600 transmits to the SNS server 500 the determined reply message to the message (passenger request) transmitted from the passenger terminal 220 (S23).

When receiving the reply message transmitted from the chatbot server 600 (S24), the SNS server 500 transmits the reply message to the passenger terminal 220 (S25).

The passenger terminal 220 generates the message screen SC1 (see FIG. 6A) including the reply message transmitted from the SNS server 500 and displays the message screen SC1 on the monitor 224 (S26). Accordingly, the passenger 210 can confirm whether or not reception of the request is completed, based on the reply message on the message screen SC1.

As described above, the chatbot server 600 according to the first embodiment can aid the communication between the crew member 260 and the passenger 210, which is performed in Face to Face in the related art, by automatically replying to the message transmitted from the passenger 210. In addition, the chatbot server 600 can reduce time and effort for monitoring and replying to the passenger request (message) transmitted from the passenger terminal 220 by the crew member 260 by automatically replying to the message transmitted from the passenger 210. Therefore, the crew member 260 can confirm the passenger request and the position of the passenger at a glance based on the notification screen SC2 (see FIG. 6B) displayed on the crew member terminal 250, and thus customer service can be made more efficient.

Next, each processing of step S1, step S3, and step S5 shown in FIG. 3 will be described in detail with reference to F5. FIG. 5 is a sequence diagram showing an example of the operation procedure (steps S1, S3, and S5) of the communication aid system 100 according to the first embodiment. Since the processing of step S1 shown in FIG. 5 is the same as the processing of step S1 shown in FIG. 4, the description thereof will be omitted.

The chatbot server 600 acquires the SNS user information (for example, the user ID used in the SNS service provided by the passenger 210 using the SNS server 500) included in the information transmitted from the SNS server 500. Based on the acquired SNS user information (user ID), the chatbot server 600 refers to the database 640 and identifies the SNS user information (user ID) and the customer ID (for example, information that is managed by a company or a management company owning the moving body and by which a passenger (customer) who uses the moving body can be identified) associated and registered in advance (S31).

The chatbot server 600 refers to the database 640, collates the customer ID of each of the plurality of passengers registered (stored) in the database 640 with the identified customer ID (S32), and identifies the flight name of the aircraft 200 registered in association with the identified customer ID and the seat number (an example of the information related to the passenger) of the passenger 210 (S33). The flight name is an example of the information by which the moving body used by the passenger 210 can be identified, and the information is not limited thereto. For example, the chatbot server 600 may identify the aircraft 200 based on the flight designator of the aircraft 200, an IP address or a domain name of the in-flight communication device 240 provided in the aircraft 200, and the like. The seat number is an example of information by which the position of the passenger 210 can be identified, and it is needless to say that the present disclosure is not limited thereto.

The chatbot server 600 analyzes the message (passenger request) transmitted from the passenger terminal 220, generates the notification information in which the analysis result of the message, the information (for example, the seat number of the passenger 210) related to the passenger 210, and the identification result (that is, the flight designator and the flight name) of the moving body are associated with one another, and transmits the notification information to the in-flight communication device 240 of the aircraft 200 (S51). The analysis result of the message here may be a message transmitted by the passenger 210, or may be information serving as a hint for providing a service to the passenger 210 such as "requesting a drink" or "calling a crew member". The message may include the identified seat number and the like of the passenger 210.

When receiving the notification information transmitted from the chatbot server 600 (S52), the in-flight communication device 240 transmits the notification information to the crew member terminal 250 (S53). The in-flight communication device 240 may transmit the notification information to all of two or more crew member terminals provided in the moving body or may transmit the notification information to one or more set crew member terminals in a case where one or more crew member terminals are set as the transmission destination of the notification information in advance.

The crew member terminal 250 generates the notification screen SC2 including the notification information transmitted from the in-flight communication device 240 and outputs the notification screen SC2 on the monitor 254 (S54). Accordingly, the crew member 260 can confirm the passenger request and the position (seat number) of the passenger 210 based on the notification screen SC2 (see FIG. 6B).

As described above, the chatbot server 600 according to the first embodiment can identify the moving body used by the passenger 210 and the position information (for example, the seat number and a cabin number) in the moving body based on the message transmitted from the passenger 210, and can transmit the position information to the crew member terminal 250 provided in the moving body. Accordingly, the chatbot server 600 can aid the communication between the crew member 260 and the passenger 210, which is performed in Face to Face in the related art. In addition, the chatbot server 600 transmits the passenger request indicated by the notification information and the position (for example, the seat number and the cabin number) of the passenger 210 indicated by the identification information by the crew member terminal 250, and can thus aid service work of the crew member 260 more efficiently.

Figure 6A:
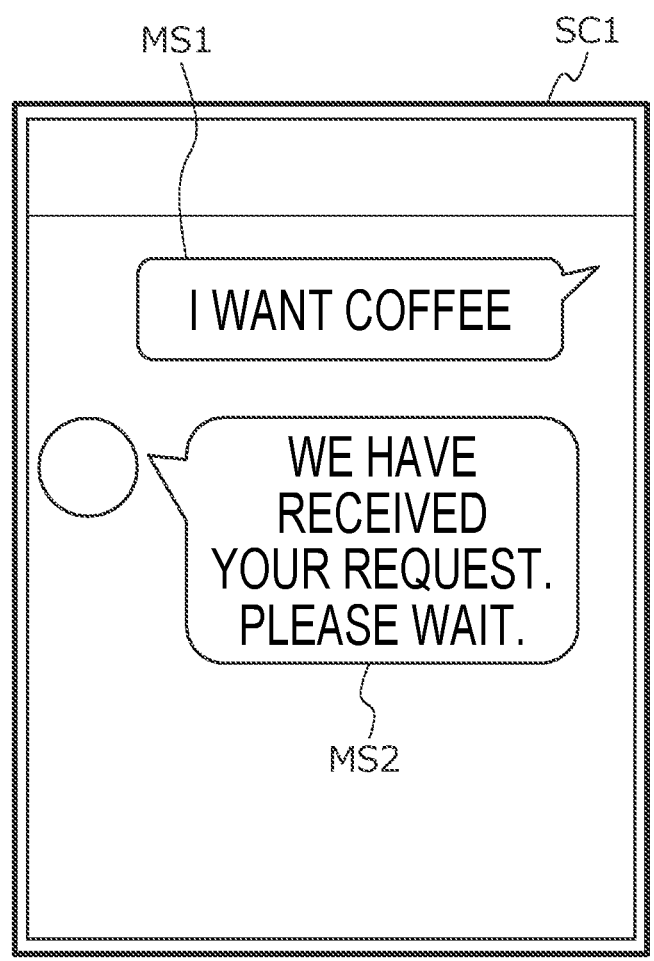
FIG. 6A is a diagram showing an example of a message screen in a passenger terminal.
Figure 6B:
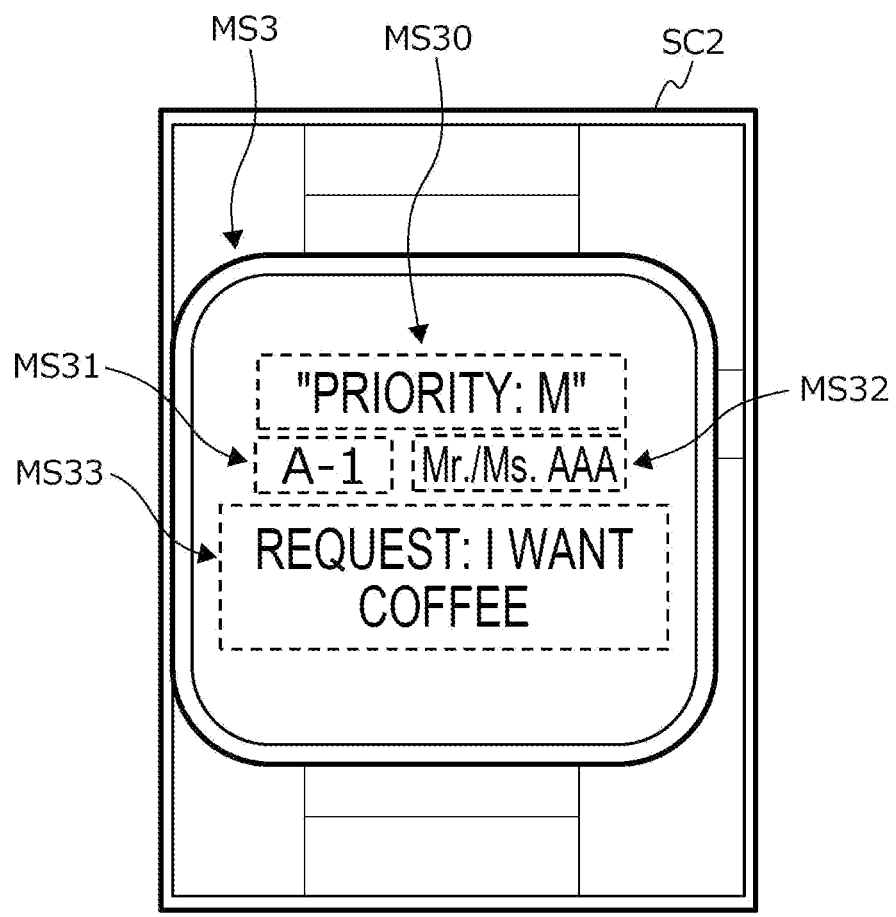
FIG. 6B is a diagram showing an example of a notification screen in a crew member terminal.

Next, the message screen SC1 displayed on the passenger terminal 220 and the notification screen SC2 displayed on the crew member terminal 250 will be described with reference to FIGS. 6A and 6B. FIG. 6A is a diagram showing an example of the message screen SC1 in the passenger terminal 220. FIG. 6B is a diagram showing an example of the notification screen SC2 in the crew member terminal 250. Each of the message screen SC1 shown in FIG. 6A and the notification screen SC2 shown in FIG. 6B is an example, and it is needless to say that the present disclosure is not limited thereto.

The message screen SC1 is generated by the processor 222 of the passenger terminal 220 and is displayed on the monitor 224 of the passenger terminal 220. The message screen SC1 shown in FIG. 6A is an example of a screen displayed on the passenger terminal 220 after the passenger 210 transmits a message MS1 "I WANT COFFEE" as the passenger request and receives a reply message MS2 "WE HAVE RECEIVED YOUR REQUEST. PLEASE WAIT." from the chatbot server 600 in response to the message MS1. The passenger 210 can know that the reception of the request is completed, based on the reply message MS2 displayed on the message screen SC1.

The notification screen SC2 is generated by the processor 252 of the crew member terminal 250 and is displayed on the monitor 254 of the crew member terminal 250. The notification screen SC2 is generated and includes a message MS3 including the notification information.

The message MS3 includes priority information MS30 indicating a priority to meet the request of the passenger 210, a seat number MS31 of the passenger 210, a passenger name MS32, and request content MS33. In the communication aid system 100 according to the first embodiment, the display of the priority information MS30 is not essential and may be omitted.

In the example shown in FIG. 6B, "PRIORITY: M" is displayed in the priority information MS30, which indicates that the priority to meet the request of the passenger 210 is medium. The seat number MS31 indicates that the seat number of the passenger 210 is "A-1". The passenger name MS32 indicates a name of the passenger 210. The request content MS33 indicates that the passenger request as the analysis result by the natural language analysis unit 622 in the chatbot server 600 is "REQUEST: I WANT COFFEE".

Although not shown in the example shown in FIG. 6B, the notification screen SC2 may display a seat table or a map in the moving body or may display a predetermined color in a superimposed manner at a position corresponding to the position information (for example, the seat number and the cabin number) of the passenger 210 on the seat table or the map in the moving body.

In the communication aid system 100 according to the first embodiment, an example is described in which when the message (passenger request) of the passenger 210 is transmitted from the passenger terminal 220 to the SNS server 500, the chatbot server 600 determines the reply message in response to the message (passenger request) of the passenger 210 and transmits the reply message to the SNS server 500, and the determination processing and the transmission processing of the reply message are not essential and may be omitted. In this case, the processor 620 of the chatbot server 600 may not be able to implement the function of the natural language analysis unit 622 or the response determination unit 623.

As described above, the chatbot server 600 as an example of the communication assist device according to the first embodiment includes: the information reception unit 611 that receives the message transmitted from the passenger terminal 220 owned by the passenger 210 in the aircraft 200 (an example of the moving body), the moving body identification unit 621 that identifies the aircraft 200 based on the passenger information (an example of the SNS user information, and for example, the user ID) which is included in the message received by the information reception unit 611 and by which the passenger 210 is able to be identified, and the information transmission unit 612 that transmits the passenger information and the information related to the message in association with each other to the in-flight communication device 240 (an example of the communication device) provided to the aircraft 200 identified by the moving body identification unit 621.

As a result, even when the passenger 210 does not install a new application in the passenger terminal 220, the chatbot server 600 according to the first embodiment can aid smooth execution of the communication between the passenger 210 and the crew member 260 using the existing social networking service.

As described above, in the chatbot server 600 according to the first embodiment, the information reception unit 611, the moving body identification unit 621, and the information transmission unit 612 are provided outside the aircraft 200. As a result, the chatbot server 600 according to the first embodiment can simultaneously aid the smooth execution of the communication between passengers and crew members using each of the plurality of aircraft devices 200.

As described above, the information reception unit 611 of the chatbot server 600 according to the first embodiment receives the message transmitted from the passenger terminal 220 to the in-flight communication device 240 (an example of the communication device). Accordingly, for example, even in a case where the aircraft 200 is traveling and the passenger terminal 220 of the passenger 210 cannot be directly connected to the Internet line network 400 for wireless communication, since the message (passenger request) is communicably connected between the Internet line network 400 and the SNS server 500 via the in-flight communication device 240 provided in the aircraft 200, the communication aid system 100 according to the first embodiment can receive the message (passenger request) transmitted from the passenger terminal 220.

As described above, the chatbot server 600 according to the first embodiment further includes the natural language analysis unit 622 which analyzes the message output from the information reception unit 611, the response determination unit 623 which determines the reply message to the message based on the analysis result analyzed by the natural language analysis unit 622, and the information transmission unit 612 transmits the reply message determined by the response determination unit 623 to the passenger terminal 220. Accordingly, the chatbot server 600 according to the first embodiment can reduce the time and effort for monitoring and replying to the passenger request (message) transmitted from the passenger terminal 220 by the crew member 260 by automatically replying to the message transmitted from the passenger 210.

As described above, in the chatbot server 600 according to the first embodiment, the information reception unit 611 is communicably connected to the SNS server 500 (an example of the server) which is provided outside the aircraft 200 and capable of providing the social networking service, and receives the message transmitted from the SNS server 500. As a result, even when the passenger 210 does not install a new application in the passenger terminal 220, the chatbot server 600 according to the first embodiment can aid the smooth execution of the communication between the passenger 210 and the crew member 260 using the existing social networking service (SNS).

As described above, the information transmission unit 612 of the chatbot server 600 according to the first embodiment transmits and displays the information related to the passenger (for example, the seat number of the passenger 210) and the information related to the message on the monitor 254 provided in the aircraft 200. Accordingly, the chatbot server 600 according to the first embodiment can identify the customer ID of the passenger 210 based on the message transmitted from the passenger 210, can transmit the customer ID to the crew member terminal 250 provided in the moving body, and can thus aid the smooth execution of the communication between the passenger 210 and the crew member 260. In addition, the chatbot server 600 transmits the passenger request indicated by the notification information and the information related to the passenger 210 (for example, the seat number of the passenger 210) by the crew member terminal 250, and can thus aid the service work of the crew member 260 more efficiently.

As described above, the information related to the passenger, which is transmitted by the chatbot server 600 according to the first embodiment, includes the position information (that is, the seat number and the like) of a seat of the passenger. Accordingly, the chatbot server 600 according to the first embodiment can identify the moving body used by the passenger 210 and the position information (for example, the seat number or the cabin number of the passenger 210) in the moving body based on the message transmitted from the passenger 210, can transmit the position information to the crew member terminal 250 provided in the moving body, and can thus aid the smooth execution of the communication between the crew member 260 and the passenger 210. In addition, the chatbot server 600 transmits the passenger request indicated by the notification information and the position (for example, the seat number or the cabin number of the passenger 210) of the passenger 210 indicated by the identification information by the crew member terminal 250, and can thus aid the service work of the crew member 260 more efficiently.

Second Embodiment

The communication aid system 100 according to the first embodiment identifies the customer ID associated with the user ID based on the SNS user information (for example, the user ID) included in the message input from the passenger 210. An example is shown in which the communication aid system 100 according to the first embodiment identifies the moving body used by the passenger 210 based on the identified customer ID, transmits the notification information including the passenger request (that is, the analysis result of the message) of the passenger 210, the customer ID, and the information (for example, the seat number) related to the passenger 210 to the crew member terminal 250 provided in the identified moving body, and displays the notification screen SC2 including the notification information. An example will be described in which a communication aid system 100A according to the second embodiment transmits notification information further including priority information which indicates a priority of a message of the passenger 210 to the crew member terminal 250 provided in the identified moving body, and displays the notification screen SC2 including the priority information MS30 (see FIG. 6B).

Figure 7:
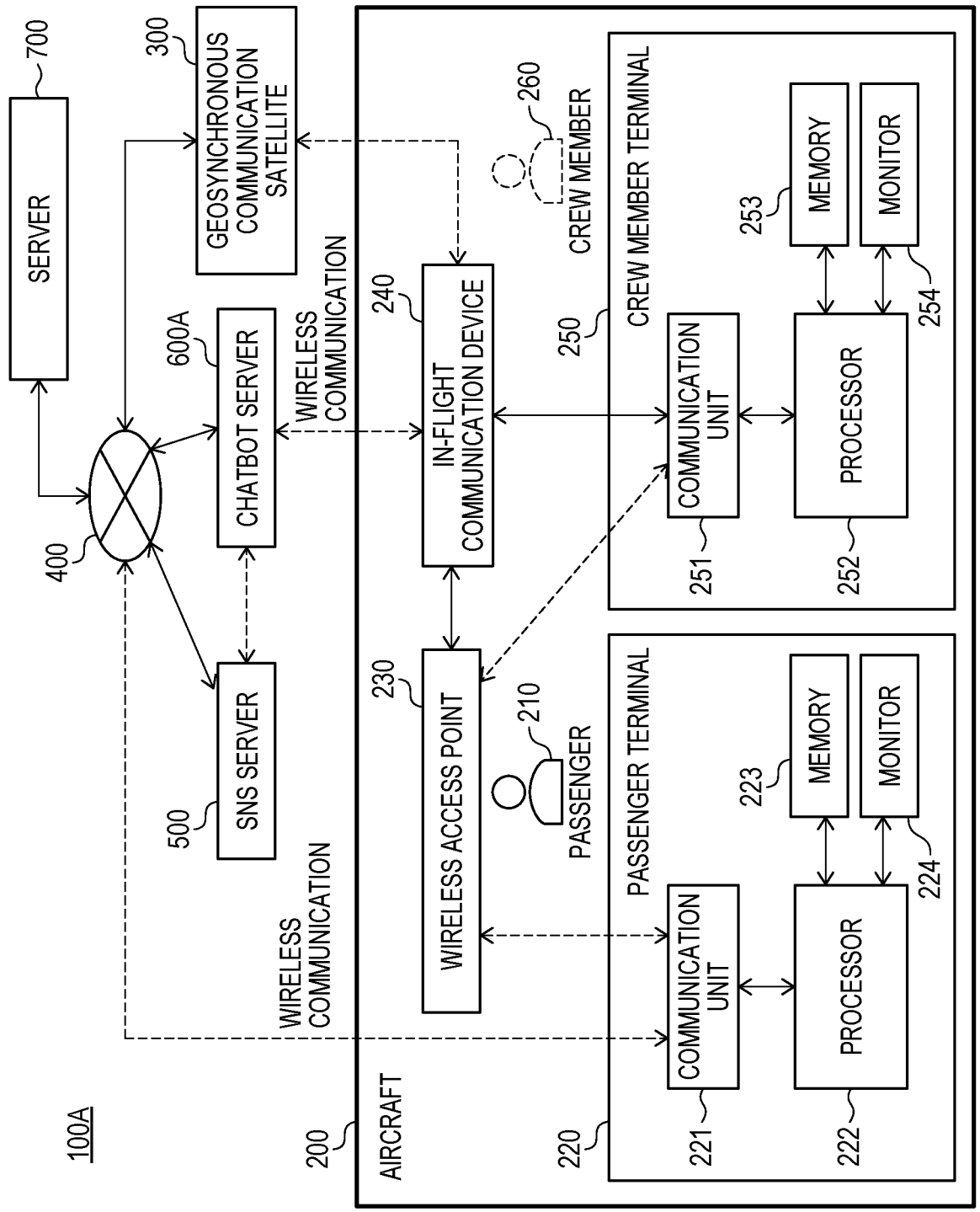
FIG. 7 is a block diagram showing an example of an overall configuration of a communication aid system according to a second embodiment.
Figure 8:
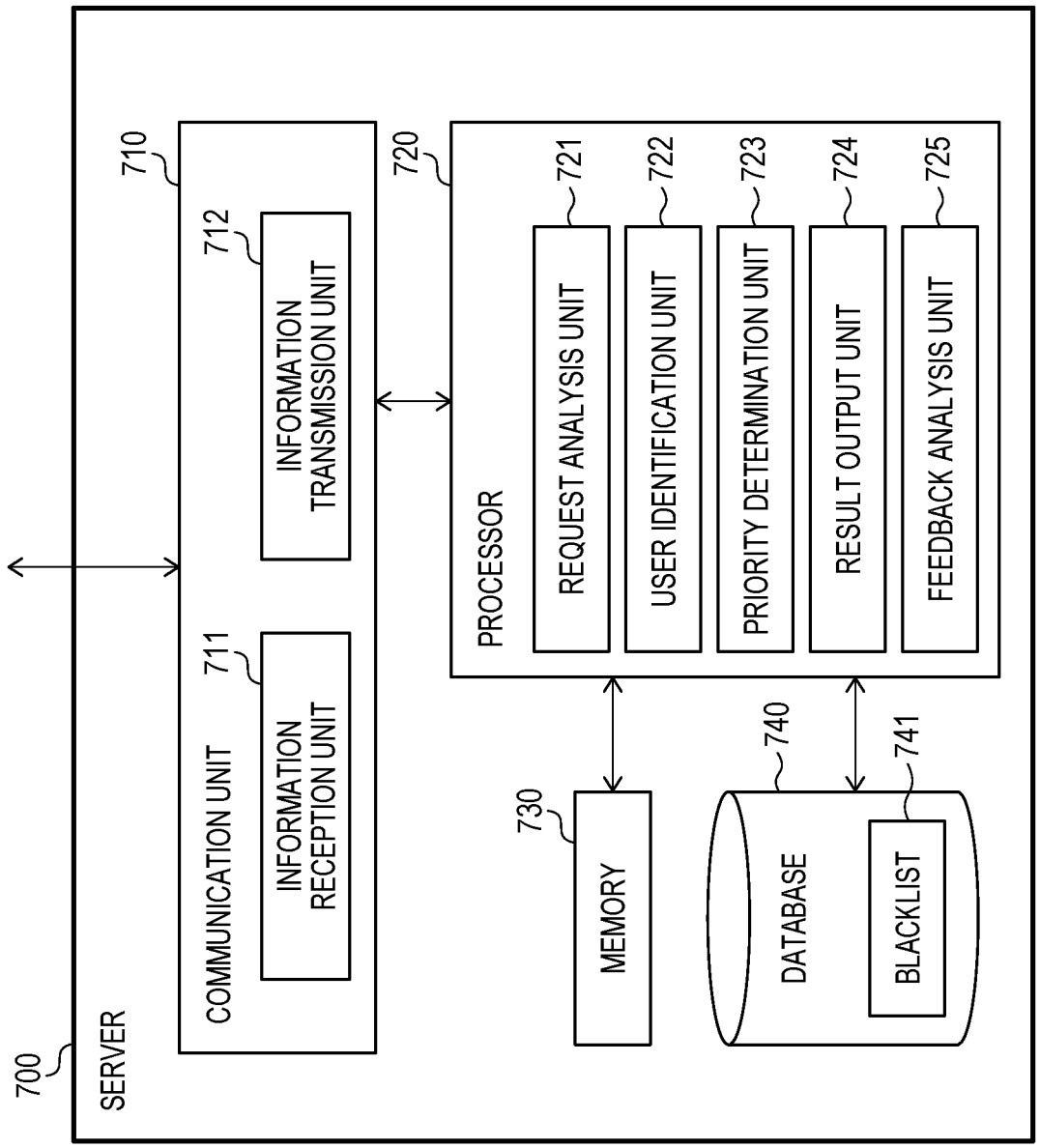
FIG. 8 is a diagram showing an example of an internal configuration of a server according to the second embodiment.

Next, an overall configuration of the communication aid system 100A according to the second embodiment will be described with reference to FIGS. 7 and 8. FIG. 7 is a block diagram showing an example of the overall configuration of the communication aid system 100A according to the second embodiment. FIG. 8 is a diagram showing an example of an internal configuration of a server 700 according to the second embodiment. The communication aid system 100A according to the second embodiment shown in FIG. 7 has substantially the same configuration as the communication aid system 100 according to the first embodiment shown in FIG. 1. The same components as those of the first embodiment are denoted by the same reference numerals and descriptions thereof are omitted.

The communication aid system 100A according to the second embodiment includes a moving body such as the aircraft 200, the geosynchronous communication satellite 300, the Internet line network 400, the SNS server 500, a chatbot server 600A, and a server (server 700 in the example shown in FIG. 7) of a company (for example, an airline company or a travel company) that manages a customer ID of a passenger who owns the moving body or uses the moving body.

The server 700 is a server of a company that owns the moving body or a company that manages information related to the passenger who uses the moving body. The server 700 is connected to the in-flight communication device 240 and the chatbot server 600 via the Internet line network 400 or the geosynchronous communication satellite 300 to be able to execute data communication. The server 700 transmits and registers in the chatbot server 600 information related to each of a plurality of moving bodies and a customer ID of each of a plurality of passengers in association with each other. The server 700 transmits and registers in the in-flight communication device 240 provided in a predetermined moving body the information related to the moving body and a customer ID of each of the plurality of passengers using the moving body in association with each other.

The server 700 identifies, based on a message (passenger request) transmitted from the passenger terminal 220 in the moving body, a customer ID corresponding to the passenger 210 who is an owner of the passenger terminal 220, the moving body being used by the passenger 210, and position information (for example, a seat number) of the passenger 210. Furthermore, the server 700 determines the priority of the message (passenger request) based on an analysis result obtained by analyzing the message (passenger request) transmitted from the passenger terminal 220 in the moving body and the customer ID of the passenger 210. The server 700 generates notification information in which the identified moving body and the customer ID, the analyzed analysis result of the message (passenger request), and the determined priority are associated with one another, and transmits the notification information to the chatbot server 600. The server 700 includes a communication unit 710, a processor 720, a memory 730, and a database 740.

The communication unit 710 is connected to the in-flight communication device 240 and the chatbot server 600 to be able to execute the data communication. The communication unit 710 may be connected to the in-flight communication device 240 and the chatbot server 600 via the Internet line network 400 or the geosynchronous communication satellite 300 to be able to execute the data communication. Specifically, the communication unit 710 may be implemented by a LAN, a satellite communication device, or the like connected to the Internet line network 400 and may transmit and receive data to and from the in-flight communication device 240 and the chatbot server 600. The communication unit 710 includes an information reception unit 711 and an information transmission unit 712.

The information reception unit 711 receives the message such as the passenger request transmitted from the chatbot server 600 and outputs the message to the processor 720. The information transmission unit 712 transmits to the in-flight communication device 240 the notification information including the analysis result of the message, the customer ID of the passenger 210, identification information related to the identified moving body (for example, a flight designator and a flight name of the aircraft 200) and the passenger 210 (for example, the seat number of the passenger 210), the priority information on the message, and the like. The notification information transmitted to the in-flight communication device 240 is transmitted to the crew member terminal 250 in the moving body and is displayed on the monitor 254.

The processor 720 is implemented by using, for example, a CPU or an FPGA, and executes various kinds of processing and controls in cooperation with the memory 730. Specifically, the processor 720 implements functions of each unit by referring to a program and data stored in the memory 730 and executing the program. Each unit referred to here includes a request analysis unit 721, a user identification unit 722, a priority determination unit 723, a result output unit 724, and a feedback analysis unit 725.

The request analysis unit 721 executes natural language processing on the message (passenger request) of the passenger 210, which is transmitted from the chatbot server 600, to analyze contents of the message. The request analysis unit 721 associates an analyzed analysis result and outputs the analysis result to the priority determination unit 723.

The user identification unit 722 acquires passenger information (for example, the user ID) based on the message of the passenger 210, which is transmitted from the chatbot server 600. The user identification unit 722 refers to the database 740, identifies the customer ID registered in association with the acquired passenger information (user ID), and determines a priority weighting coefficient set for the passenger 210 based on past history information (for example, information in which a past message (passenger request) for each passenger (that is, the customer ID) and information on a priority of the past message are associated with each other) of the identified customer ID (that is, the passenger 210). Specifically, the user identification unit 722 calculates, based on the past history information on the passenger 210 registered (stored) in the database 740, a frequency of a message whose priority is determined to be less than a threshold value (hereinafter referred to as "low priority request") among the messages transmitted from the passenger 210. The user identification unit 722 determines whether or not the calculated frequency of the low priority request is equal to or greater than (for example, twice or three times) the threshold value, and determines the priority weighting coefficient set for the passenger 210 based on a determination result.

When determining that the identified passenger 210 is a passenger registered in a blacklist 741, the user identification unit 722 may determine the priority weighting coefficient of the passenger 210 as a preset minimum value. Furthermore, the user identification unit 722 may generate a blacklist notification information indicating that the identified passenger 210 is the passenger registered in the blacklist 741.

The user identification unit 722 identifies, based on the acquired passenger information (user ID), the customer ID of the passenger 210, a flight designator (flight number) of the aircraft 200 used by the passenger 210, and the seat number of the passenger 210 with reference to the database 640. The user identification unit 722 outputs to the priority determination unit 723 the analysis result of the message, an identification result including the customer ID of the identified passenger 210, the flight designator (flight number) of the aircraft 200 used by the passenger 210, and the seat number of the passenger 210, and the determined priority weighting coefficient of the passenger 210 in association with one another. When the blacklist notification information is generated, the user identification unit 722 may further associate the generated blacklist information and outputs the generated blacklist information to the priority determination unit 723.

The priority determination unit 723 determines the priority of the message based on the analysis result of the message output from the request analysis unit 721 and the priority weighting coefficient output from the user identification unit 722. The priority determination unit 723 outputs the analysis result of the message, the identification result, and the determined priority weighting coefficient of the passenger 210 to the result output unit 724 in association with one another.

The result output unit 724 outputs the priority determined by the priority determination unit 723 and the customer ID of the passenger 210 to the database 740 in association with each other for storage. The result output unit 724 generates notification information in which the analysis result output from the request analysis unit 721 output from the priority determination unit 723, the identification result output from the user identification unit 722, and the priority of the message are associated with one another, and transmits the notification information to the in-flight communication device 240 via the Internet line network 400 or the geosynchronous communication satellite 300.

The feedback analysis unit 725 analyzes feedback information corresponding to the notification information transmitted from the crew member terminal 250. The feedback information is information that is generated by an operation of the crew member 260 using the crew member terminal 250 and transmitted to the server 700 and is information indicating whether the priority of the message determined by the priority determination unit 723 is appropriate. The feedback analysis unit 725 rewrites the priority of the passenger 210 registered (stored) in the database 740, based on the analysis result of the feedback information.

The memory 730 includes, for example, an RAM as a work memory used when processing of the processor 720 is executed, and an ROM that stores a program defining the processing of the processor 720. Data generated or acquired by the processor 720 is temporarily stored in the RAM. The program defining the processing of the processor 720 is written into the ROM.

The database 740 is implemented by using an HDD or an SSD. The database 740 registers (stores) the information (specifically, the flight designator, the flight number, and the seat table of the aircraft) related to the moving body, information (for example, the customer ID) related to each of a plurality of passengers using the moving body, and past history information on each of the plurality of passengers in association with one another. The database 740 stores the blacklist 741 in which a customer ID of a passenger having a high transmission frequency of the low priority request is registered (stored).

The above-described processor 720 of the server 700 may generate first learning data capable of learning the priority weighting coefficient of each passenger and second learning data capable of learning the priority for each content of the message (passenger request) based on the feedback information transmitted from the crew member terminal 250. When the processor 720 is capable of machine learning, the memory 730 stores the first and second learning data generated by the processor 720.

Learning for generating each of the first and second learning data may be executed using one or more statistical classification techniques. Examples of the statistical classification technique include, for example, linear classifiers, support vector machines, quadratic classifiers, kernel estimation, decision trees, artificial neural networks, Bayesian techniques and/or networks, hidden Markov models, binary classifiers, multi-class classifiers, a clustering technique, a random forest technique, a logistic regression technique, a linear regression technique, and a gradient boosting technique. However, the statistical classification technique to be used is not limited thereto.

The chatbot server 600A in the second embodiment is connected to the in-flight communication device 240, the SNS server 500, and the server 700 to be able to execute the data communication. The chatbot server 600A registers (stores) to the database 640 the information related to the moving body transmitted from the server 700, the customer ID of each of the plurality of passengers using the moving body, and the past history information on each of the plurality of passengers in association with one another. When receiving the message transmitted from the SNS server 500, the chatbot server 600A transmits the received message and the SNS user information (for example, the user ID) included in the message to the server 700 in association with each other.

Figure 9:
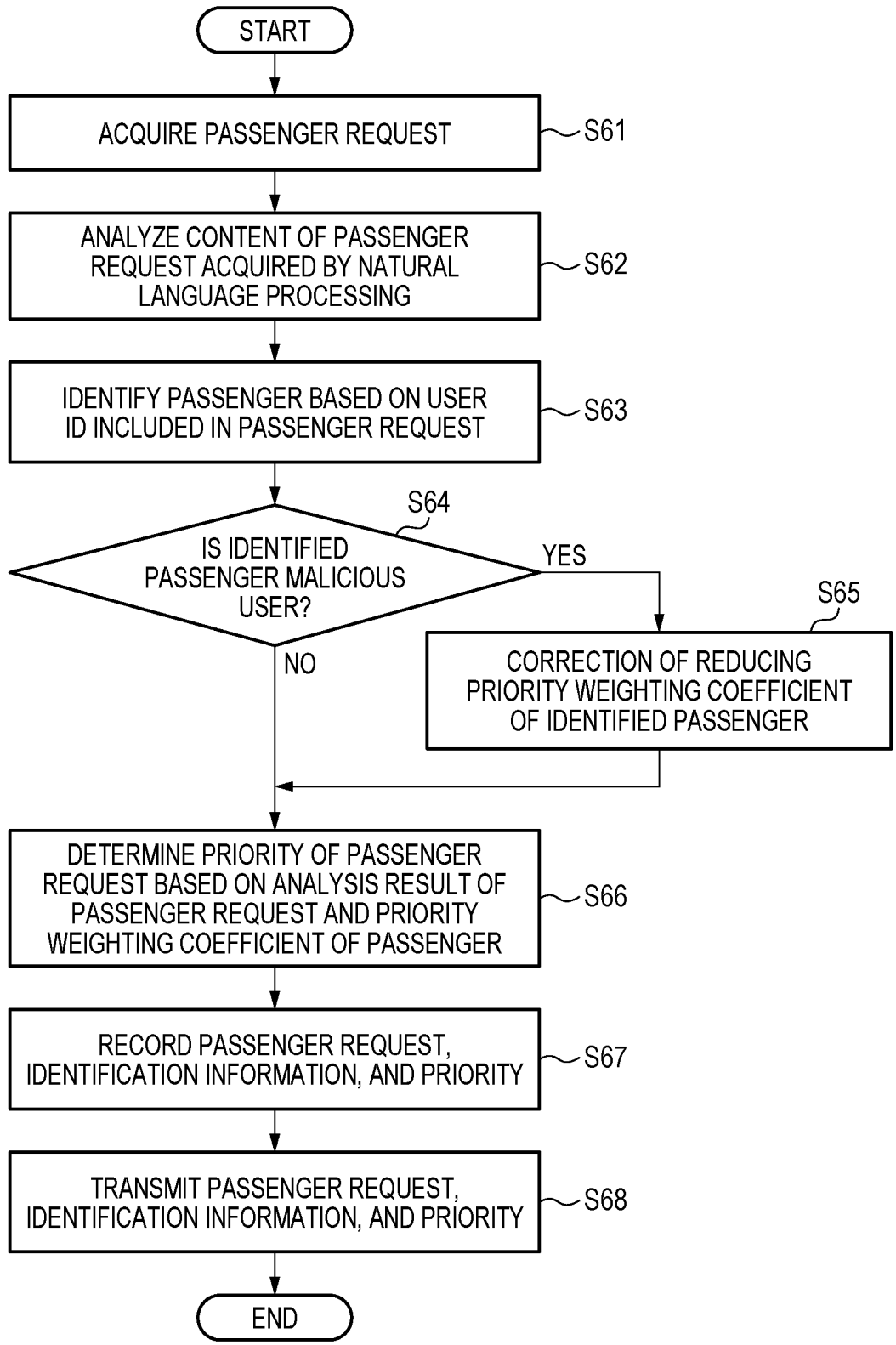
FIG. 9 is a flowchart showing an example of an operation procedure of the server according to the second embodiment.

Next, an operation procedure (a procedure of generating the notification information) of the server 700 of the second embodiment will be described with reference to FIG. 9. FIG. 9 is a flowchart showing an example of the operation procedure of the server 700 according to the second embodiment.

The server 700 acquires the message (passenger request) transmitted from the chatbot server 600 (S61). The server 700 executes the natural language processing on the acquired message (passenger request) and analyzes the contents of the message (passenger request) (S62). The server 700 identifies the customer ID (that is, the passenger 210) registered in association with the user ID, based on the user ID included in the message (passenger request) transmitted from the chatbot server 600 with reference to the database 740 (S63).

The server 700 determines whether the identified passenger 210 is an unscrupulous user (S64). Specifically, the server 700 determines whether the frequency of the low priority request of the passenger 210 is equal to or greater than (for example, 60% or greater or 70% or greater) the threshold value based on the past history information on the passenger 210 (S64). When determining that the identified passenger 210 is the malicious user (S64, YES) in the processing of step S64, the server 700 executes correction of reducing the priority weighting coefficient of the identified passenger 210 (that is, minus correction) (S65). On the other hand, when determining that the identified passenger 210 is not a malicious user (S64, NO) in the processing of step S64, the server 700 omits the correction processing of the priority weighting coefficient of the identified passenger 210 (S66).

In the processing of step S64, the server 700 may further determine whether the identified passenger 210 is registered in the blacklist 741 and may correct the priority weighting coefficient of the identified passenger 210 to the minimum value when determining that the identified passenger 210 is registered in the blacklist 741. In the processing of step S64, the server 700 may simply determine whether the identified passenger 210 is registered in the blacklist 741.

The server 700 determines the priority of the message (passenger request) based on the analysis result of the message (passenger request) and the priority weighting coefficient of the passenger 210 (S66). The server 700 records (registers) the message (passenger request), the identified customer ID, and the determined priority of the message (passenger request) to the database 740 in association with one another as the past history information on the passenger 210 (S67). The message (passenger request) recorded in the database 740 may be the message (passenger request) per se or the analysis result of the message (passenger request). The server 700 generates the notification information in which the message (passenger request), the identification information including the customer ID, the information on the aircraft 200, and the seat number of the passenger 210, and the determined priority of the message (passenger request) are associated with one another, and transmits the notification information to the crew member terminal 250 via the in-flight communication device 240 (S68).

Figure 10:
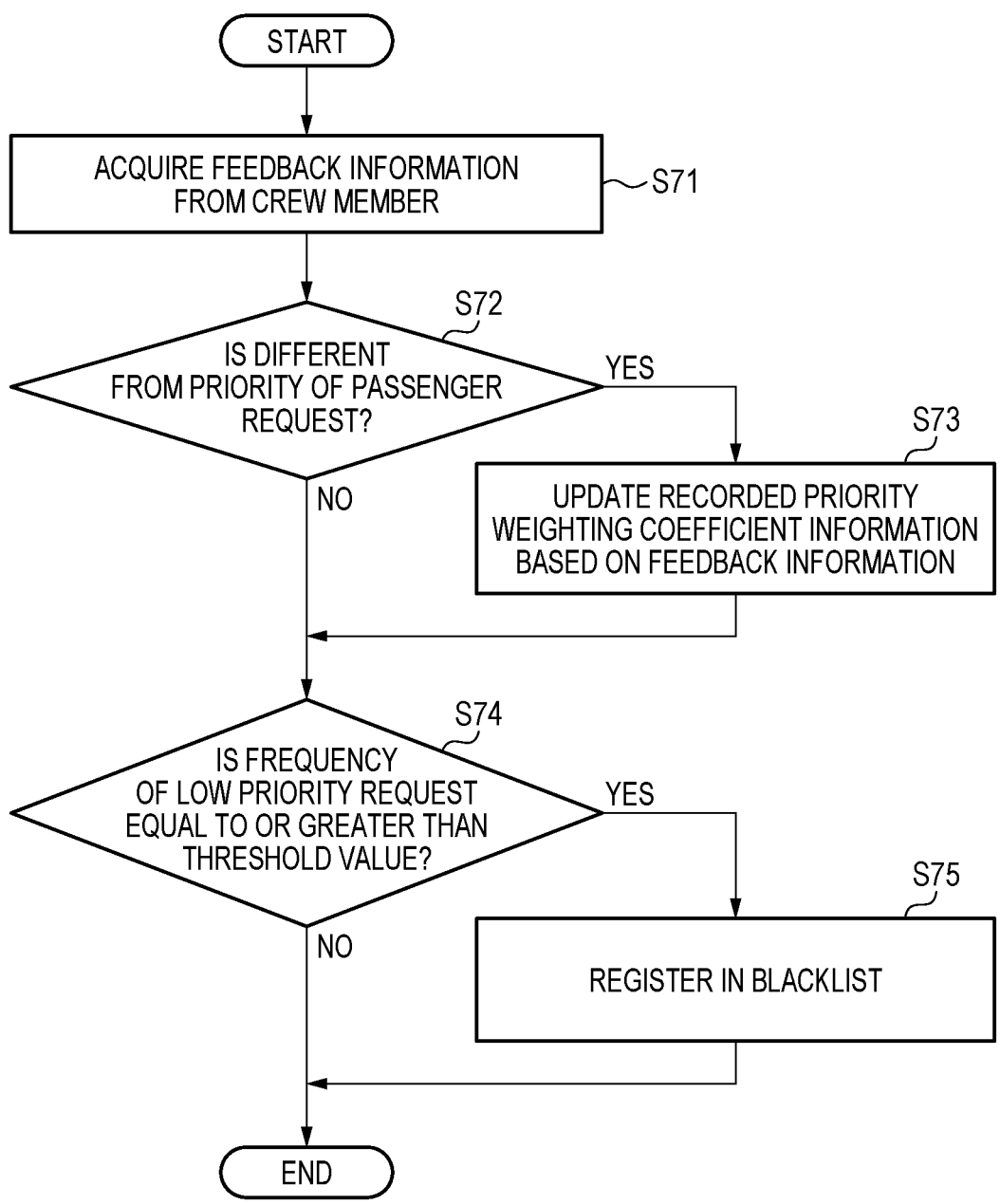
FIG. 10 is a flowchart showing an example of the operation procedure of the server according to the second embodiment.

Next, an operation procedure (a procedure of reflection processing of feedback information) of the server 700 of the second embodiment will be described with reference to FIG. 10. FIG. 10 is a flowchart showing an example of the operation procedure of the server 700 according to the second embodiment.

First, the crew member terminal 250 generates the notification screen SC2 (see FIG. 6B) based on the notification information transmitted from the server 700 and displays the notification screen SC2 on the monitor 254. The notification screen SC2 generated by the crew member terminal 250 according to the second embodiment is generated including the priority information MS30. The crew member 260 inputs to the crew member terminal 250 the feedback information related to the priority of the message (passenger request) included in the notification screen SC2 displayed on the monitor 254 of the crew member terminal 250. Here, the feedback information is information indicating that the priority of the message (passenger request) determined by the server 700 is high, low, or appropriate. The crew member terminal 250 transmits the feedback information input by the operation of the crew member 260 to the server 700. The feedback information may be transmitted to the server 700 in association with the notification information.

The server 700 acquires the feedback information input by the crew member 260 and transmitted from the crew member terminal 250 (S71). The server 700 determines, based on the acquired feedback information, whether or not the priority of the message (passenger request) determined in the processing of step S66 is different from the priority considered by the crew member 260 (that is, whether the priority of the message (passenger request) is too high or too low) (S72). In the processing of step S72, when determining, based on the acquired feedback information, that the priority of the message (passenger request) determined in the processing of step S66 is different from the priority considered by the crew member 260 (S72, YES), the server 700 updates the priority weighting coefficient recorded as the past history information corresponding to the feedback information, based on the feedback information (S73).

After the processing of step S73 or in the processing of step S72, when determining, based on the acquired feedback information, that the priority of the message (passenger request) determined in the processing of step S66 is not different from the priority considered by the crew member 260 (S72, NO), the server 700 calculates the frequency of the low priority request of the passenger 210 based on the past history information on the passenger 210 who transmits the message (passenger request) corresponding to the feedback information. The server 700 determines whether or not the calculated frequency of the low priority request of the passenger 210 is equal to or greater than (for example, 60% or greater or 70% or greater) the threshold value (S74). In the processing of step S74, when determining that the calculated frequency of the low priority request of the passenger 210 is equal to or greater than the threshold value (S74, YES), the server 700 registers the passenger 210 in the blacklist 741 (S75). On the other hand, in the processing of step S74, when determining that the calculated frequency of the low priority request of the passenger 210 is not equal to or greater than the threshold value (S74, NO), the server 700 ends the reflect processing of the feedback information transmitted from the crew member terminal 250.

Although various embodiments are described above with reference to the drawings, it is needless to say that the present disclosure is not limited to such examples. It is apparent to a person skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the various embodiments described above may be combined freely in a range without deviating from the spirit of the disclosure.

INDUSTRIAL APPLICABILITY

The present disclosure is useful as a communication assist device capable of aiding smooth execution of communication between a passenger and a crew member.

REFERENCE SIGNS LIST 100, 100A: communication aid system
200: aircraft
210: passenger
220: passenger terminal
230: wireless access point
240: in-flight communication device
250: crew member terminal
254: monitor
260: crew member
500: SNS server
600, 600A: chatbot server
610, 710: communication unit
611, 711: information reception unit
612, 712: information transmission unit
620, 720: processor
621: moving body identification unit
622: natural language analysis unit
623: response determination unit
640, 740: database

The invention claimed is:

1. A communication assist device comprising:
a communication device that receives, from a passenger terminal owned by a passenger in an aircraft that is traveling, a message transmitted from the passenger terminal, the communication device being provided outside the aircraft and being located on the ground; and
a processor that identifies the aircraft based on passenger information which is included in the message received by the communication device and by which the passenger is able to be identified,
wherein the communication device (i) transmits, to a crew member terminal provided in the aircraft that is traveling, the passenger information and position information on a seat of the passenger in association with each other, and (ii) displays the transmitted passenger information and transmitted position information on the crew member terminal, the crew member terminal being operable by a crew member,
wherein the communication assist device is provided outside the aircraft and is located on the ground,
wherein a server provides a social networking service to the passenger terminal, and
wherein the communication device receives the message from the passenger terminal via the social networking service provided by the server.

2. The communication assist device according to claim 1, wherein
the processor analyzes the message received by the communication device, and the processor determines a reply message to the received message based on the analysis, and
the communication device transmits the reply message determined by the processor to the passenger terminal.

3. A communication assist method executable by a communication assist device, the communication assist method comprising:
receiving, from a passenger terminal owned by a passenger in an aircraft that is traveling, a message transmitted from the passenger terminal;
identifying the aircraft based on passenger information which is included in the received message by which the passenger is able to be identified; and
(i) transmitting, to a crew member terminal provided in the aircraft that is traveling, the passenger information and position information on a seat of the passenger in association with each other, and (ii) displaying the transmitted passenger information and transmitted position information on the crew member terminal, the crew member terminal being operable by a crew member,
wherein the communication assist device is provided outside the aircraft and is located on the ground,
wherein a server provides a social networking service to the passenger terminal, and
wherein in the receiving, the message transmitted from the passenger terminal is received via the social networking service provided by the server.

4. The communication assist method according to claim 3, further comprising:
analyzing the received message, and determining a reply message to the received message based on the analyzing; and
transmitting the determined reply message to the passenger terminal.

* * * * *